May 5, 1964

H. H. ADELAAR

CROSSPOINT NETWORK FOR A TIME DIVISION
MULTIPLEX TELECOMMUNICATION SYSTEM 3,132,210

Filed Sept. 13, 1960

2 Sheets-Sheet 1

Inventor
H. H. ADELAAR
By Paul W. Hemminger
Agent

May 5, 1964

H. H. ADELAAR

CROSSPOINT NETWORK FOR A TIME DIVISION MULTIPLEX TELECOMMUNICATION SYSTEM 3,132,210

Filed Sept. 13, 1960

2 Sheets-Sheet 2

Inventor
H. H. ADELAAR
By Paul W. Hemminger
Agent

United States Patent Office 3,132,210
Patented May 5, 1964

3,132,210

CROSSPOINT NETWORK FOR A TIME DIVISION MULTIPLEX TELECOMMUNICATION SYSTEM

Hans H. Adelaar, Antwerp, Belgium, assignor to International Standard Electric Corporation, New York, N.Y., a corporation of Delaware Filed Sept. 13, 1960, Ser. No. 55,631
8 Claims. (Cl. 179—27.54)

Figure 1:
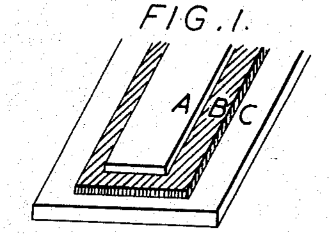

The invention relates to a crosspoint network for a time division multiplex telecommunication system, for example the type of automatic telephone exchange in which speech connections are realized on a time sharing basis. For purposes of this description the term time division multiplex will be designated as T.D.M.

In a multi-stage time division multiplex interconnecting network such as that disclosed in U.S. Patent No. 2,910,540, issued October 27, 1959, to S. Van Mierlo et al., switched connections are to be made directly between any one link of a first set of T.D.M. links to any one link of a second set of T.D.M. links. The basic arrangement for the switching network is thus most suitably that of a rectangular crosspoint network. In a variant, requiring the establishment of switched connections between any two links of a single set of T.D.M. links, the most appropriate arrangement is that of a triangular crosspoint network.

T.D.M. telephony makes use of pulses whose duration is of the order of the microsecond, and thus in order to provide effective shielding, the T.D.M. links conveying these pulses are generally constituted by coaxial cable lengths. The switching elements in T.D.M. telephony are, at the present state of the technique, best constituted by high-speed symmetrical transistors. In view of the cost of these transistor switches, it is highly desirable to realize each interconnection of two T.D.M. links using but a single transistor, the return or ground conductors of the two links being permanently connected.

The simple transposition of known voice frequency arrangements, in which the crosspoint network involves only the forward conductors while all return conductors are permanently connected to earth, will lead to an unacceptable level of crosstalk.

On the other hand, the use of a coaxial cable within the crosspoint network is costly and unsuitable in an industrial production. A link within the network would be constituted by a number of short lengths of coaxial cable connecting the crosspoints of the same coordinate line. This type of assembly may be envisaged for very small networks, but, in spite of the use of coaxial cable throughout, remains a priori deficient from the point of view of the crosstalk since the shielding is interrupted at every crosspoint.

An object of the invention is to develop a crosspoint network of a simple structure, adapted to modern production techniques, in which crosstalk is kept at an acceptable level, and in which a switched connection may preferably be realized by a single switching element.

The invention is characterized in that two sets of essentially parallel microstrip lines, extending respectively in different directions, are disposed respectively on either side of a regular geometrical surface, for example a plane, to form a coordinate crosspoint arrangement. It is further characterized in that a switched connection may be realized between two microstrip lines, one of either set, by switching means connected to said microstrip lines at their crosspoint which are at points of said microstrip lines such that in a perpendicular projection on said geometrical surface the images of these points are in the vicinity of the intersection of the images of said two microstrip lines.

Microstrip transmission lines may be cheaply and conveniently produced by printed wiring techniques. They lend themselves particularly well to the realization of a crosspoint network. Although the shielding is not perfect as in a coaxial cable, it remains excellent. On a given microstrip line, there is no discontinuity at the crosspoints, and the crosstalk arising in the network is negligible. The transistor switches may have their leads directly soldered to the two microstrip lines at their crosspoint. Two switches may be used at each crosspoint or, in a far more economical and preferred embodiment, a single switch, with a permanent electrical contact between the ground conductors of the two microstrips.

For a network in which there is provided but a single switch per crosspoint, all ground conductors being in permanent electrical contact, a preferred embodiment of the invention is characterized in that a single ground plate is utilized in common for both sets of microstrip lines.

The above mentioned and other objects and characteristics of the invention, and the best manner of attaining them will be better understood from the following detailed description of embodiments to be read in conjunction with the accompanying drawings which represent:

FIG. 1, a microstrip line.

Figure 2:
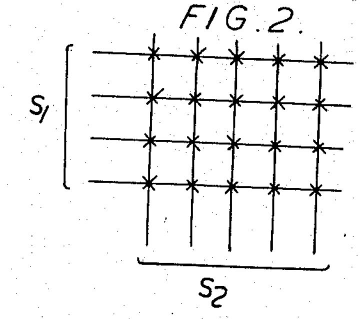

FIG. 2, a first interconnection plan.

Figure 3:
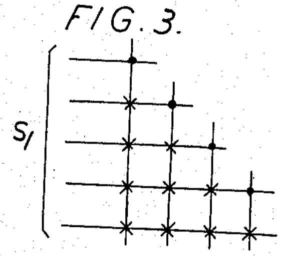

FIG. 3, a second interconnection plan.

Figures 4, 5:
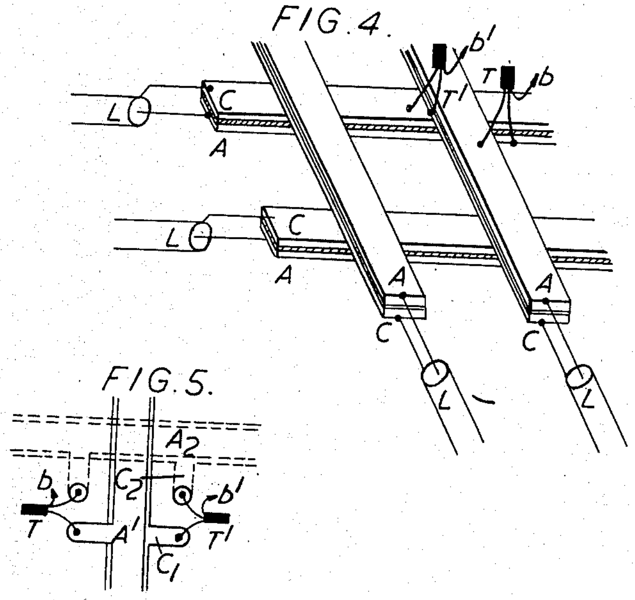

FIG. 4, a crosspoint network using microstrip lines.

FIG. 5, a crosspoint network using printed microstrip lines.

Figure 6:
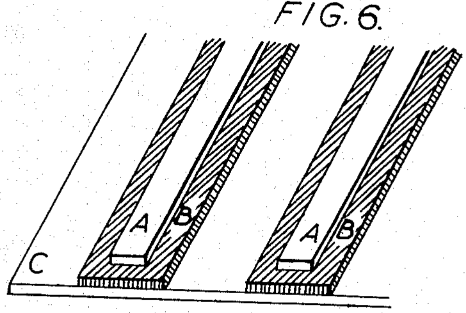

FIG. 6, a sub-assembly for a printed microstrip line crosspoint network.

Figure 7:
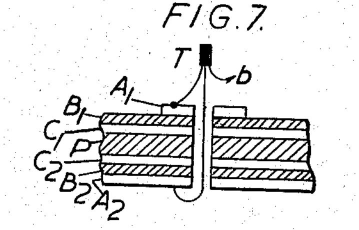

FIG. 7, a crosspoint of a network made up of two of the sub-assemblies of FIG. 6.

Figure 8:
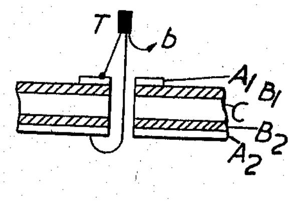

FIG. 8, a crosspoint of an improved crosspoint network using printed microstrip lines.

Figure 9:
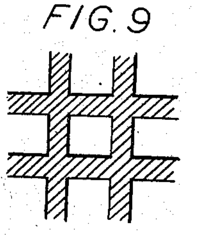

FIG. 9, a schematic grid arrangement for a crosspoint network.

The microstrip line is a well known microwave component. It is an open transmission line consisting of a line conductor disposed above ground. As represented on FIG. 1, the line conductor A is a conducting ribbon isolated from the earth conductor C by a dielectric layer B. A, B and C may be of different widths (FIG. 1) or of the same width (as on FIG. 4).

The microstrip line is a parallel plane wave-guide which, similarly to a coaxial line, can transmit a transverse electromagnetic field of any frequency. The field is entirely situated between the two conducting planes, with a slight fringe effect. The coupling between two parallel microstrip lines disposed in the same plane at a distance superior to twice the width of the lines is negligible as is the coupling between two lines disposed one above the other, ground conductors facing one another. Microstrip lines can thus be disposed in a coordinate array without there arising any significant coupling between the different lines.

The characteristic impedance of a microstrip line is given by $$Z=120\pi\sqrt{\frac{\mu_r}{\delta r}}\,\frac{h}{b}$$

where $\mu_r$ and $\delta_r$ are respectively the relative permeability and permittivity of the dielectric, while $h$ and $b$ are respectively the distance between the line and ground conductors, i.e. the dielectric thickness, and the width of the line conductor. The microstrip lines may always be designed to have the same characteristic impedance as that of the coaxial cable utilized in the interconnecting network outside of the crosspoint network. Experimentation has further shown that there is a very large tolerance insofar as the adaptation of coaxial cable and microstrip line impedances are concerned.

The coaxial cable T.D.M. links in a T.D.M. telephone exchange may thus, for the purpose of their mutual interconnection, be extended by microstrip lines which lend themselves particularly well to the realization of a variety of different types of crosspoint networks. The basic switching arrangements are those of FIGS. 2 and 3. In FIG. 2, any one of a first set S1 of T.D.M. links is to be connected to any one of a second set S2 of T.D.M. links over switching means represented as a cross at the corresponding crosspoint. In FIG. 3, any two links of a single set S1 of T.D.M. links are to be connected; the crosspoints on the hypotenuse, corresponding to permanent connections, are marked with a circle. In both the rectangular array of FIG. 2 and the triangular array of FIG. 3, the coordinate lines are to be materialized by microstrip lines.

The basic crosspoint network arrangement utilizing microstrip lines is represented by FIG. 4, which should be understood to be but a fragment of a larger network. The two sets of microstrip lines are disposed with the earth conductors C facing each other, so as to minimize coupling. At each crosspoint, two transistors T and T' are disposed to ensure the switched connection between the microstrip lines at their crosspoint, and connect respectively the line conductors A and the earth conductors C. The emitter and collector leads may be soldered directly to the microstrip lines or connected to them by any other means; the base leads *b* and *b'* are connected to control circuits. On FIG. 4 the transistors are shown at only one of the crosspoints. The microstrip lines are supported at their extremities in any convenient manner by a supporting frame, not shown in FIG. 4, and at one extremity are connected to the coaxial cable links L.

An alternative realization of the crosspoint network of FIG. 4, is indicated on FIG. 5, on which but a single crosspoint is represented. An isolating board P not represented, supports on either face the two sets S1 and S2 of microstrip lines. Two microstrip lines, A1—C1 of set S1 and A2—C2 of set S2, are shown at their crosspoint on FIG. 5. The ground conductors C of the microstrip lines are printed directly on P, the printed conductors having lateral offshoots at each crosspoint. Except for these offshoots they are covered by a thin strip of dielectric material, not shown on FIG. 5, on which are deposited the line conductors A, also with offshoots at each crosspoint. The emitter and collectors leads of transistors T and T' are soldered to the microstrips at their offshoots, access being given to the microstrips of the set S2 by any convenient means, e.g. connecting eyelets or pins piercing the supporting board P. This realization is more complex than that of FIG. 4, but requires no mechanical assembly.

The use of two transistors at each crosspoint of the networks of FIGS. 4 and 5 constitutes an optimum design with respect to crosstalk performance. In a far more economical realization, the transistors T' are replaced by a permanent connection. These connections constitute a source of conductive coupling between the different microstrip lines. It is to be expected, however, that, by reason of the guided nature of the electromagnetic field in the microstrip line, the crosstalk remains negligible. This has been verified experimentally for this and for other microstrip crosspoint network arrangements described below, in which the ground conductors are permanently connected.

The electromagnetic field remains guided in the dielectric between the line and ground conductors and localized in the shadow of the line conductor, even if the ground conductor extends to form an indefinite surface. The microstrip lines of one set may thus be constituted by a number of parallel conducting strips (line conductors) above a common conducting plate (common ground conductor). A crosspoint network will be constituted by two such sub-assemblies, disposed so that the microstrip lines of either set are perpendicular to one another.

FIG. 6 represents a subassembly as described above. The line conductors A, are disposed on dielectric strips B above a common ground conductor C. In an alternative realization, a single common dielectric layer may be used.

The structure of the crosspoint network realized by the apposition of two such sub-assemblies is shown by FIG. 7, which gives a cross-section of the network at a crosspoint. The two sub-assemblies A1, B1, C1, A2, B2, C2 are disposed on either side of a supporting plate P, with their common ground conductors C1 and C2 in regard. The supporting plate P may be conducting or isolating, in which latter case the ground conductors C1 and C2 will be strapped so as to be in electrical contact. The supporting plate P may be suppressed in a realization in which each sub-assembly is sufficiently rigid so as to be self-supporting. On FIG. 7 a hole is shown passing through the entire structure to allow for the passage of the transistor lead towards the line conductor A2. In a practical realization, this latter connection may, for instance, be realized with the aid of a connecting pin, passing through the structure to one side of the line conductor A1, isolated from the common ground conductors C1, C2, and in electrical contact with the line conductor A2.

In an alternative realization utilizing two sub-assemblies such as that of FIG. 6, these may be apposed with their line conductors in regard. The common ground conductors, on the exterior faces of the structure, completely screen the crosspoint network from all outside influence. The two sub-assemblies will be supported by a central isolated conducting plate, which acts as a screen between the two sets of line conductors.

The assembly of FIG. 7 may also be realized as a single integral structure, made up by successively printing conducting surfaces or strips and depositing dielectric layers on a supporting surface. In this case, however, the structure of FIG. 8 will be preferred. In FIG. 8, a single conducting plate C is used as common ground conductor by both sets of microstrip lines, the line conductors of which such as A1 and A2 are printed on dielectric layers B1 and B2 deposited on C.

In alternative arrangements to those of FIGS. 7 and 8 respectively, the common ground conductors are in the form of a grid as on FIG. 9, instead of a full plate.

The use of a grid as common ground conductor makes it possible to realize the crosspoint network as an apertured structure similar to that of FIG. 4. In such a structure it is possible to introduce a high permeability magnetic material which considerably attenuates whatever residual crosstalk is generated in the crosspoint network. The action of this magnetic material will be appreciated from the following lumped-constant analysis of the microstrip line network.

A microstrip line presents a certain inductive impedance to the current traversing it. In a network in which the ground conductors are permanently connected, there exists a large number of alternative current paths, forming loops with respect to the desired path, and also characterized by inductive impedances. The crosstalk arising from the conductive coupling in the network is essentially proportional to the ratio of the inductances of the desired and undesired paths. The impedance of the latter may be increased a thousand fold by the introduction of high permeability magnetic material to constitute around the undesired loop a path of low magnetic reluctance. This magnetic shielding also intervenes to strongly attenuate whatever direct magnetic coupling may exist between neighbouring microstrip lines.

The magnetic shielding may be realized by means of iron wire wound around the microstrip lines, or by a ferrite rod structure passing through the apertures of the grid or by any other convenient means.

While the principles of the invention have been described above in connection with specific apparatus and applications, it is to be clearly understood that this description is made only by way of example and not as a limitation on the scope of the invention.

I claim:

1. A coordinate crosspoint network comprising a plurality of first conductors arranged in parallel rows in first and second parallel planes with the said conductors in one plane positioned normal to the conductors in the other of said planes, switch means at each of the crossover points of the conductors of one plane with the conductors of the other of said planes for interconnecting any selected one of the conductors of one plane with any selected one of the conductors of the other plane, and shielding means positioned between the said conductors of one plane and the said conductors of the other plane, said shielding means being electrically insulated from said first conductors.

2. A coordinate crosspoint network as set forth in claim 1 wherein the said shielding means comprises a plurality of individual conductors corresponding respectively to the said first conductors, each said individual conductor being positioned longitudinally adjacent the respectively corresponding first conductor with the said individual conductors associated with the first conductors of one plane being in electrical contact with the individual conductors associated with the first conductors of the other of said planes.

3. A coordinate crosspoint network as set forth in claim 1 wherein said shielding means comprises a single conducting medium common to and adjacent all of said first conductors in both of said planes.

4. A coordinate crosspoint network as set forth in claim 1 wherein said shielding means comprises a first and a second conducting medium and wherein one of said conducting mediums is common to and adjacent all the said first conductors in one of said planes and the second said conducting medium is common to and adjacent all of the said first conductors in the said other plane, and wherein the said first and second conducting mediums are in electrical contact with each other.

5. A coordinate crosspoint network as set forth in claim 1 wherein said shielding means comprises a conductive material in a lattice form common to all the said first conductors in each of said planes, and wherein the said first conductors of one of said planes are positioned adjacent the conductive material extending in one direction and the said first conductors in the other said plane are positioned adjacent the conductive material extending in a direction normal thereto.

6. A coordinate crosspoint network as set forth in claim 1 wherein said shielding means comprises a single conducting medium common to and adjacent all of said first conductors in both of said planes, and wherein aperture means are provided in said shielding means at each of said crossover points for permitting the said interconnection of the said switch means between the said first conductors in each plane at their said crossover points.

7. A coordinate crosspoint network as set forth in claim 1 wherein said shielding means comprises a first and a second conducting medium and wherein one of said conducting mediums is common to and adjacent all the said first conductors in one of said planes and the second conducting medium is common to and adjacent all of the said first conductors in the said other plane with the said first and second conducting mediums being in electrical contact with each other, and aperture means in said shielding means at each of said crossover points for permitting the said interconnection of the said switch means between the said first conductors in each plane at their said crossover points.

8. A coordinate crosspoint network as set forth in claim 1 wherein the said shielding means are insulated from their respectively corresponding first conductors by a highly permeability magnetic material positioned therebetween.

References Cited in the file of this patent

UNITED STATES PATENTS

| | | |
|---|---|---|
| 2,901,547 | Miloche | Aug. 25, 1959 |
| 2,925,471 | Licht | Feb. 16, 1960 |
| 2,992,410 | Groth et al. | July 11, 1961 |